US012663688B2

(12) United States Patent
Heaton et al.

(10) Patent No.: US 12,663,688 B2
(45) Date of Patent: Jun. 23, 2026

(54) DEEP-ETCHED ELECTRO-OPTIC WAVEGUIDE MODULATOR WITH NON-CONSTANT WAVEGUIDE WIDTH

(71) Applicant: Lumentum Technology (UK) Limited, Northamptonshire (GB)

(72) Inventors: John M. Heaton, Worcestershire (GB); Robert Griffin, Northamptonshire (GB); Maxime Poirier, Gatineau (CA); Neil David Whitbread, Northamptonshire (GB)

(73) Assignee: Lumentum Technology UK Limited, Northamptonshire (GB)

( * ) Notice: Subject to any disclaimer, the term of this patent is extended or adjusted under 35 U.S.C. 154(b) by 390 days.

(21) Appl. No.: 18/525,129

(22) Filed: Nov. 30, 2023

(65) Prior Publication Data

US 2025/0116910 A1 Apr. 10, 2025

Related U.S. Application Data

(60) Provisional application No. 63/588,512, filed on Oct. 6, 2023.

(51) Int. Cl.
 *G02F 1/225* (2006.01)
 *G02F 1/21* (2006.01)
(52) U.S. Cl.
 CPC .............. *G02F 1/225* (2013.01); *G02F 1/212* (2021.01)
(58) Field of Classification Search
 CPC ................................. G02F 1/225; G02F 1/212
 See application file for complete search history.

(56) References Cited

U.S. PATENT DOCUMENTS

| | | | | |
|---|---|---|---|---|
| 6,324,199 B1 * | 11/2001 | Capasso | ................ | H01S 5/3402 |
| | | | | 372/50.1 |
| 6,456,766 B1 * | 9/2002 | Shaw | ..................... | G02B 6/423 |
| | | | | 385/47 |
| 6,556,604 B1 * | 4/2003 | Capasso | ................ | B82Y 20/00 |
| | | | | 257/14 |
| 6,716,476 B2 * | 4/2004 | Ouellet | ................... | C23C 16/56 |
| | | | | 427/167 |

(Continued)

OTHER PUBLICATIONS

Christopher D. Watson, et al.; "Acoustooptic Resonance in Deep-Etched GaAs—AlGaAs Electrooptic Modulators"; Journal of Lightwave Technology, vol. 22, No. 6, Jun. 2004; pp. 1598-1603, IEEE.

*Primary Examiner* — Andrew Jordan
(74) *Attorney, Agent, or Firm* — Harrity & Harrity, LLP

(57) ABSTRACT

In some implementations, an electro-optic waveguide modulator includes a deep-etched waveguide. A first cladding is disposed on a top surface of the deep-etched waveguide. A second cladding is disposed on a bottom surface of the deep-etched waveguide. The deep-etched waveguide has a length that extends in a first direction and a width that extends in a second direction. The width of the deep-etched waveguide is non-constant along at least a portion of the length of the deep-etched waveguide. For example, a difference between a maximum width of the deep-etched waveguide and a minimum width of the deep-etched waveguide along at least the portion of the length of the deep-etched waveguide satisfies a width difference threshold that is equal to 10% of the maximum width.

20 Claims, 3 Drawing Sheets

(56)                References Cited

U.S. PATENT DOCUMENTS

| | | | | |
|---|---|---|---|---|
| 6,744,548 | B2 * | 6/2004 | Abeles | G02F 1/3132 |
| | | | | 359/254 |
| 6,839,491 | B2 * | 1/2005 | Painter | G02F 1/3137 |
| | | | | 385/39 |
| 6,959,123 | B2 * | 10/2005 | Painter | G02F 1/0118 |
| | | | | 385/39 |
| 6,999,671 | B2 * | 2/2006 | Painter | G02F 1/3137 |
| | | | | 385/129 |
| 7,031,577 | B2 * | 4/2006 | Painter | G02B 6/30 |
| | | | | 385/39 |
| 7,130,509 | B2 * | 10/2006 | Painter | B82Y 20/00 |
| | | | | 385/39 |
| 7,444,055 | B2 * | 10/2008 | Tolstikhin | G02B 6/125 |
| | | | | 398/79 |
| 7,614,253 | B2 * | 11/2009 | Ouellet | G02B 6/124 |
| | | | | 65/379 |
| 7,853,108 | B2 * | 12/2010 | Popovic | G02F 1/3133 |
| | | | | 385/132 |
| 7,903,909 | B2 * | 3/2011 | Popovic | G02B 6/125 |
| | | | | 385/27 |
| 8,068,706 | B2 * | 11/2011 | Popovic | G02B 6/12007 |
| | | | | 385/28 |
| 8,116,603 | B2 * | 2/2012 | Popovic | G02B 6/125 |
| | | | | 385/27 |
| 8,611,534 | B2 * | 12/2013 | Finlayson | G02F 1/0136 |
| | | | | 380/256 |
| 8,644,358 | B2 * | 2/2014 | Liu | B82Y 20/00 |
| | | | | 372/45.01 |
| 8,831,049 | B2 * | 9/2014 | Feng | H01S 5/141 |
| | | | | 372/20 |
| 9,595,629 | B2 * | 3/2017 | Qian | H10F 71/00 |
| 10,509,163 | B2 * | 12/2019 | Li | H01S 5/028 |
| 10,741,999 | B2 * | 8/2020 | Evans | H01S 5/02453 |
| 11,556,041 | B2 * | 1/2023 | Park | G02F 1/2255 |
| 11,681,167 | B2 * | 6/2023 | Thomas | H01S 5/026 |
| | | | | 385/2 |
| 12,099,267 | B2 * | 9/2024 | Thomas | G02B 6/12004 |
| 12,199,405 | B2 * | 1/2025 | Evans | H01S 5/06821 |
| 2002/0122615 | A1 * | 9/2002 | Painter | G02F 1/0118 |
| | | | | 385/24 |
| 2003/0019838 | A1 * | 1/2003 | Shaw | G02B 6/4228 |
| | | | | 216/20 |
| 2003/0059556 | A1 * | 3/2003 | Ouellet | G02B 1/10 |
| | | | | 427/255.28 |
| 2003/0070451 | A1 * | 4/2003 | Ouellet | C23C 16/56 |
| | | | | 65/386 |
| 2003/0133176 | A1 * | 7/2003 | Abeles | G02F 1/2255 |
| | | | | 359/240 |
| 2005/0135721 | A1 * | 6/2005 | Painter | G02B 6/30 |
| | | | | 385/1 |
| 2005/0135764 | A1 * | 6/2005 | Painter | G02F 1/3137 |
| | | | | 385/129 |
| 2005/0207699 | A1 * | 9/2005 | Painter | G02F 1/0118 |
| | | | | 385/32 |
| 2006/0039653 | A1 * | 2/2006 | Painter | G02B 6/12007 |
| | | | | 385/50 |
| 2007/0130996 | A1 * | 6/2007 | Ouellet | C23C 16/402 |
| | | | | 65/391 |
| 2008/0138008 | A1 * | 6/2008 | Tolstikhin | G02B 6/125 |
| | | | | 385/14 |
| 2008/0166095 | A1 * | 7/2008 | Popovic | G02B 6/107 |
| | | | | 385/15 |
| 2008/0273565 | A1 * | 11/2008 | Gmachl | H01S 5/3402 |
| | | | | 372/45.012 |
| 2009/0142019 | A1 * | 6/2009 | Popovic | G02B 6/1223 |
| | | | | 385/28 |
| 2010/0111303 | A1 * | 5/2010 | Finlayson | G02F 1/0136 |
| | | | | 380/256 |
| 2011/0026879 | A1 * | 2/2011 | Popovic | G02F 1/3133 |
| | | | | 385/28 |
| 2011/0080930 | A1 * | 4/2011 | Liu | H01S 5/0014 |
| | | | | 372/45.012 |
| 2011/0158584 | A1 * | 6/2011 | Popovic | G02B 6/10 |
| | | | | 385/28 |
| 2014/0079082 | A1 * | 3/2014 | Feng | H01S 5/101 |
| | | | | 372/20 |
| 2014/0113397 | A1 * | 4/2014 | Qian | G02F 1/025 |
| | | | | 438/57 |
| 2017/0163000 | A1 * | 6/2017 | Evans | H01S 5/1028 |
| 2017/0163001 | A1 * | 6/2017 | Evans | H04B 10/572 |
| 2017/0230117 | A1 * | 8/2017 | Li | H01S 5/4087 |
| 2018/0259710 | A1 * | 9/2018 | Stabile | G02B 6/305 |
| 2018/0331497 | A1 * | 11/2018 | Evans | H01S 5/0261 |
| 2019/0310496 | A1 * | 10/2019 | Zilkie | H01S 5/026 |
| 2020/0301069 | A1 * | 9/2020 | Li | G02B 6/12002 |
| 2020/0363663 | A1 * | 11/2020 | Zilkie | H01S 5/12 |
| 2021/0080761 | A1 * | 3/2021 | Zilkie | H01S 5/026 |
| 2021/0199995 | A1 * | 7/2021 | Zilkie | H01S 5/12 |
| 2021/0311333 | A1 * | 10/2021 | Thomas | H01S 5/0085 |
| 2023/0296841 | A1 * | 9/2023 | Lee | G02B 6/4203 |
| | | | | 385/43 |
| 2023/0359069 | A1 * | 11/2023 | Thomas | G02F 1/025 |
| 2025/0102838 | A1 * | 3/2025 | Thomas | H01S 5/0085 |
| 2025/0116910 | A1 * | 4/2025 | Heaton | G02F 1/225 |
| 2025/0298284 | A1 * | 9/2025 | Liang | G02F 1/2255 |

* cited by examiner

DEEP-ETCHED ELECTRO-OPTIC WAVEGUIDE MODULATOR WITH NON-CONSTANT WAVEGUIDE WIDTH

CROSS-REFERENCE TO RELATED APPLICATION

This patent application claims priority to U.S. Patent Application No. 63/588,512, filed on Oct. 6, 2023, and entitled "METHOD FOR REDUCING ACOUSTO-OPTIC DISTORTION OF ELECTRO-OPTIC MODULATOR FREQUENCY RESPONSE." The disclosure of the prior application is considered part of and is incorporated by reference into this patent application.

TECHNICAL FIELD

The present disclosure relates generally to an electro-optic waveguide modulator and to an electro-optic waveguide modulator with non-constant waveguide width.

BACKGROUND

In a deep-etched waveguide, an etch depth extends from an upper cladding, through the waveguide, and into a lower cladding region. When the waveguide comprises a material that includes an unconstrained linear electro-optic crystal, applying an electric field to the waveguide (e.g., to enable electro-optic modulation of the waveguide) can cause a mechanical deformation of the material (e.g., as a result of a converse piezoelectric effect). This material strain can result in acoustic waves (e.g., that are generated by an exposed depletion field of the waveguide and then confined by sidewalls of the waveguide), often referred to as acousto-optic effect.

SUMMARY

In some implementations, an electro-optic waveguide modulator includes a deep-etched waveguide; a first cladding that is disposed on a top surface of the deep-etched waveguide; and a second cladding that is disposed on a bottom surface of the deep-etched waveguide, wherein: the deep-etched waveguide has a length that extends in a first direction and a width that extends in a second direction, and the width of the deep-etched waveguide is non-constant along at least a portion of the length of the deep-etched waveguide.

In some implementations, an electro-optic waveguide modulator includes a deep-etched waveguide, wherein: the deep-etched waveguide has a length that extends in a first direction and a width that extends in a second direction, and a difference between a maximum width of the deep-etched waveguide and a minimum width of the deep-etched waveguide along at least a portion of the length of the deep-etched waveguide satisfies a width difference threshold that is equal to 10% of the maximum width.

In some implementations, an electro-optic device includes an electro-optic waveguide modulator with a deep-etched waveguide, wherein: the deep-etched waveguide has a length that extends in a first direction and a width that extends in a second direction, and the width of the deep-etched waveguide is non-constant along at least a portion of the length of the deep-etched waveguide.

DETAILED DESCRIPTION

The following detailed description of example implementations refers to the accompanying drawings. The same reference numbers in different drawings may identify the same or similar elements.

An electro-optic waveguide modulator can include a waveguide (e.g., that includes a III-V semiconductor material; an electro-optic material, such as lithium niobate ($LiNbO_3$) or silicon (Si); and/or another material). In many cases, such as when the waveguide is deep-etched, an acousto-optic effect can cause a resonance in frequency response of the electro-optic waveguide modulator (e.g., an acousto-optic effect in the waveguide of the electro-optic waveguide modulator). This can be referred to as an acousto-optic resonance. For example, an acousto-optic effect in a deep-etched waveguide (e.g., that comprises indium phosphide (InP) and/or gallium arsenide (GaAs)) of an electro-optic waveguide modulator can cause an acousto-optic resonance when half of an acoustic wavelength associated with the acousto-optic effect (e.g., an acoustic wavelength associated with a frequency of the acousto-optic effect) is equal to a width of the waveguide. This acousto-optic resonance can be difficult to identify and difficult to address, which impacts a performance of the electro-optic waveguide modulator.

Some implementations described herein include an electro-optic waveguide modulator that includes a waveguide (e.g., a deep-etched waveguide) with a non-constant width. For example, the waveguide may have a first width at a first point (e.g., along a length of the waveguide) that is less than a second width at a second point (e.g., along the length of the waveguide). To enable the waveguide to have the non-constant width, the waveguide may include at least one sidewall that is tapered, curved, corrugated and/or rough.

The non-constant width of the waveguide enables an acousto-optic resonance (e.g., due to an acousto-optic effect) in the electro-optic waveguide modulator to be minimized. For example, in contrast to a waveguide with a constant width, the non-constant width causes an amplitude (e.g., a difference between a maxima and a minima) of the acousto-optic resonance to be reduced and/or a width of the acousto-optic resonance to be distributed over a larger frequency range (e.g., rather than concentrated in a narrower frequency range). This thereby reduces an impact that the acousto-optic resonance has on a performance of the electro-optic waveguide modulator.

Figure 1:
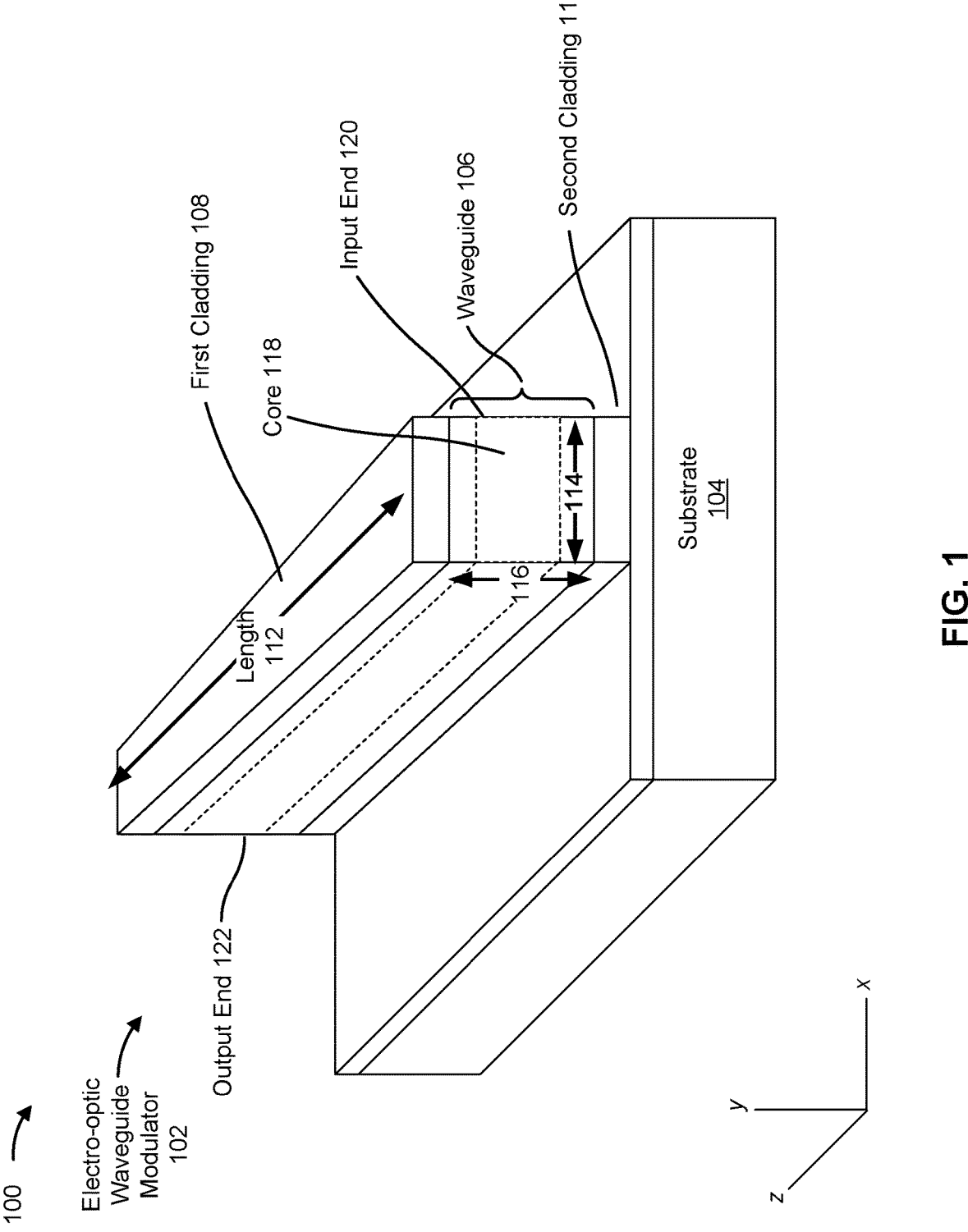
FIG. 1 is a diagram of an example implementation described herein.

FIG. 1 is a diagram of an example implementation 100 described herein. FIG. 1 shows an angled front view of an electro-optic waveguide modulator 102. The electro-optic waveguide modulator 102 may be included in an electro-optic device, such as a Mach Zehnder modulator chip (e.g., that supports frequencies from 1 to 50 gigahertz (GHz)), or another type of electro-optic device (e.g., for fiber communications). As shown in FIG. 1, electro-optic waveguide modulator 102 may include a substrate 104, a waveguide 106, a first cladding 108, and/or a second cladding 110.

The substrate 104 is a supporting material upon which, or within which, one or more layers or features of the electro-optic waveguide modulator 102 are grown, fabricated, or otherwise formed. In some implementations, the substrate 104 may comprise a material that includes at least one of indium phosphide (InP), gallium arsenide (GaAs), aluminum gallium arsenide (AlGaAs), and/or another III-V semiconductor material. In practice, the substrate 104 may be a III-V semiconductor substrate that corresponds to a III-V material included in the electro-optic waveguide modulator 102 (or the waveguide 106 of the electro-optic waveguide modulator 102). Thus, the electro-optic waveguide modulator 102 may in some implementations be referred to as a III-V semiconductor electro-optic waveguide modulator. In some implementations, the substrate 104 may comprise a material that includes at least one of indium antimonide (InSb), gallium antimonide (GaSb), indium arsenide (InAs), gallium phosphide (GaP), and/or another material.

The waveguide 106 may be disposed on the substrate 104. The waveguide 106 is a structure, channel, or other optical element that is configured to confine and propagate light within the waveguide 106, as further described herein. In some implementations, the waveguide 106 may comprise a material that includes at least one of InP, GaAs, AlGaAs, another III-V semiconductor material, an electro-optic material (e.g., lithium niobate ($LiNbO_3$), silicon (Si), indium antimonide (InSb), gallium antimonide (GaSb), indium arsenide (InAs), and/or gallium phosphide (GaP)), and/or another material. As shown in FIG. 1, the waveguide has a length 112 that extends in a first direction (e.g., that is parallel to the z-axis shown in FIG. 1), a width 114 that extends in a second direction (e.g., that is parallel to the x-axis shown in FIG. 1), and a height 116 that extends in a third direction (e.g., that is parallel to the y-axis shown in FIG. 1). That is, the first direction, the second direction, and the third direction may be orthogonal to each other. Further, each of the length 112, the width 114, and the height 116 may be different from each other. Each of the width 114 and the height 116 may extend from 0.5 to 4.0 micrometers (μm) (e.g., greater than or equal to 0.5 μm and less than or equal to 4.0 μm). In some implementations, a cross-section of the waveguide 106 (e.g., at a point along the length 112 of the waveguide 106) may be a square, a rectangle, a polygon, or another type of shape (e.g., round or with curved portions).

The waveguide 106 may be associated with the first cladding 108 and/or the second cladding 110. For example, the first cladding 108 and/or the second cladding 110 may be disposed on respective surfaces of the waveguide 106 (e.g., a top surface and a bottom surface, respectively, as shown in FIG. 1) and may be configured to confine light within the waveguide 106 (e.g., when the light propagates within the waveguide, as further described herein). In some implementations, each of the first cladding 108 and the second cladding 110 may comprise a material that includes at least one of InP, GaAs, AlGaAs, another III-V semiconductor material, an electro-optic material (e.g., lithium niobate ($LiNbO_3$), silicon (Si), indium antimonide (InSb), gallium antimonide (GaSb), indium arsenide (InAs), and/or gallium phosphide (GaP)), and/or another material, and may have a refractive index that is less than a refractive index of the waveguide 106 (e.g., to facilitate confining light withing the waveguide 106).

As shown in FIG. 1, the second cladding 110 may be disposed on the substrate 104 (e.g., a top surface of the substrate 104), the waveguide 106 may be disposed on the second cladding 110 (e.g., a top surface of the second cladding 110), and the first cladding 108 may be disposed on the waveguide 106 (e.g., the top surface of the waveguide 106). In this way, the waveguide 106, as well as the first cladding 108 and at least a portion of the second cladding 110 may form a raised structure on the substrate 104. An etching process (or a similar material removal process) may be used to remove portions of the first cladding 108, the waveguide 106, and the second cladding 110 to cause the raised structure to be formed. This may be referred to as a "deep etching" process because portions of each of the first cladding 108, the waveguide 106, and the second cladding 110 are removed, which results in sidewalls of the waveguide 106 being "exposed" (e.g., with no cladding disposed on the sidewalls). Accordingly, the waveguide 106 may be referred to as a "deep-etched waveguide."

In some implementations, a passivation layer (not shown in FIG. 1) may be disposed on each of the sidewalls of the waveguide 106. The passivation layer may comprise a material that includes at least a dielectric, such as silicon dioxide ($SiO_2$). The passivation layer may be configured to protect a sidewall from exposure to air (e.g., to prevent oxidation of a core 118 of the waveguide 106, described herein). The passivation layer may have a thickness that satisfies (e.g., is less than or equal to) a thickness threshold, wherein the thickness threshold is 0.1 μm. As an alternative, in some implementations, no passivation layer may be disposed on the sidewalls of the waveguide 106.

As further shown in FIG. 1, the waveguide 106 may include the core 118. The core 118 may comprise a material that includes at least InP, GaAs, AlGaAs, another III-V semiconductor material, an electro-optic material (e.g., lithium niobate ($LiNbO_3$), silicon (Si), indium antimonide (InSb), gallium antimonide (GaSb), indium arsenide (InAs), and/or gallium phosphide (GaP)), and/or another material, and may include, for example, one or more dopants. In some implementations, the core 118 may include an electro-optical material that is capable of changing one or more optical properties, such as a refractive index, of the core 118 in response to an applied electrical field (e.g., to enable electro-optic modulation). The core 118 may be disposed within a central region (indicated by dashed lines in FIG. 1) of the waveguide 106. For example, the central region may extend along at least a portion of the width 114 and at least a portion of the height 116 of the waveguide 106, and may extend from an input end 120 of the waveguide 106 to an output end 122 of the waveguide 106 along the length 112 of the waveguide 106.

Accordingly, the waveguide 106 may be configured to receive light at the input end 120 of the waveguide 106, to propagate the light (e.g., via at least the core 118 of the waveguide 106) from the input end 120 to the output end 122 of the waveguide 106, and to provide the light from the output end 122 of the waveguide 106 (e.g., from at least the core 118). In this way, the waveguide 106 may be configured to propagate light (e.g., via at least the core 118 of waveguide 106) from the input end 120 of the output end 122 in the first direction (e.g., along the length 112 of the waveguide 106).

In some implementations, the width 114 of the waveguide 106 may be non-constant along at least a portion of the length 112 of the waveguide 106. For example, as shown in FIG. 1, the width 114 of the waveguide 106 at the input end 120 of the waveguide 106 may be greater than the width 114 of the waveguide 106 at the output end 122 of the waveguide 106 (e.g., because sidewalls of the waveguide 106 are tapered "inward" from the input end 120 to the output end 122). The width 114 of the waveguide 106 may be non-constant when, for example, a difference between a maximum width 114 of the waveguide 106 and a minimum width 114 of the waveguide 106 (e.g., along at least a portion of the length 112 of the waveguide 106) satisfies (e.g., is greater than or equal to) a width difference threshold. The width difference threshold may be, for example, a particular percentage of the maximum width 114 of the waveguide 106 (e.g., 1%, 2%, 3%, 5%, 10%, 15%, or another percentage). In some implementations, the width 114 of the waveguide 106 may be non-constant along at least a portion of the length 112 of the waveguide 106 when, for example, at least one sidewall of the waveguide 106 (e.g., along at least the portion) is tapered (e.g., angled inward with respect to the first direction, as shown in FIG. 1, or angled outward with respect to the first direction), is curved (e.g., is non-linear, such as elliptical, sinusoidal, scalloped, or another non-linear shape, with respect to the first direction), corrugated, and/or is rough (e.g., such that a difference between a maximum width 114 of the waveguide 106 and a minimum width 114 of the waveguide 106 along at least the portion satisfies the width difference threshold).

In this way, the non-constant width 114 of the waveguide 106 (e.g., along at least the portion of the length 112 of the waveguide 106) enables an acousto-optic resonance in the electro-optic waveguide modulator 102 to be minimized. For example, in contrast to a waveguide 106 with a constant width, the non-constant width 114 of the waveguide 106 may cause an amplitude (e.g., a difference between a maxima and a minima) of the acoustic-optic resonance to be reduced and/or a width of the acoustic-optic resonance to be distributed over a larger frequency range (e.g., rather than concentrated in a narrower frequency range). Additional description related to minimization of the acoustic-optic resonance due to the non-constant width 114 of the waveguide 106 is described herein in relation to FIG. 3.

As indicated above, FIG. 1 is provided as an example. Other examples may differ from what is described with regard to FIG. 1. The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more functions described as being performed by another set of components shown in FIG. 1.

Figure 2:
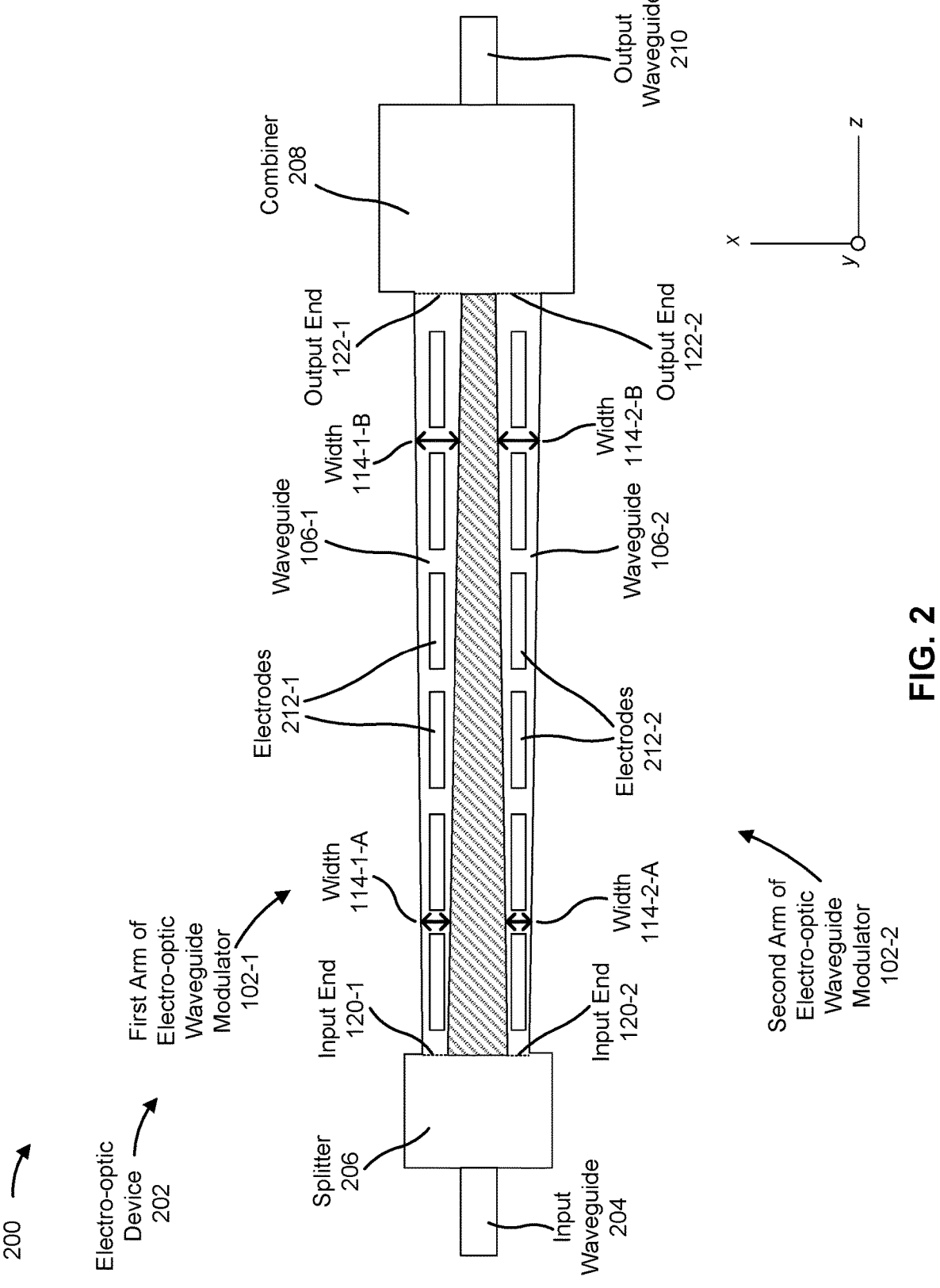
FIG. 2 is a diagram of an example implementation described herein.

FIG. 2 is a diagram of an example implementation 200 described herein. FIG. 1 shows a top-down view of an electro-optic device 202, such as a Mach Zehnder modulator chip (e.g., that supports frequencies from 1 to 50 GHz), or another type of electro-optic device (e.g., for fiber communications). The electro-optic device 202 may include a plurality of the electro-optic waveguide modulators 102 described herein in relation to FIG. 1.

As shown in FIG. 2, the electro-optic device 202 may include an input waveguide 204, a splitter 206, two arms of an electro-optic waveguide modulator 102 (shown as a first arm of an electro-optic waveguide modulator 102-1 and a second arm 102-2), a combiner 208, one or more output waveguides 210 (shown as a single output waveguide 210), and a plurality of electrodes 212 (shown as a first plurality of electrodes 212-1 and a second plurality of electrodes 212-2).

Each waveguide of the input waveguide 204 and the output waveguide 210 may include a structure, channel, or other optical element that is configured to confine and propagate light within the waveguide. In some implementations, each waveguide may comprise a material that includes at least InP, GaAs, AlGaAs, another III-V semiconductor material, an electro-optic material (e.g., lithium niobate (LiNbO$_3$), silicon (Si), indium antimonide (InSb), gallium antimonide (GaSb), indium arsenide (InAs), and/or gallium phosphide (GaP)), and/or another material. Each of the splitter 206 and the combiner 208 may be configured to split or combine light, and may include, for example, a multimode interference (MMI) structure, a diffractive optical element (DOE), a segmented mirror, a beam splitter (e.g., a conventional beam splitter, a polarized beam splitter, or another type of beam splitter), and/or another type of optical element.

The input waveguide 204 may be configured to propagate light to the splitter 206. The splitter 206 may be configured to split the light into a first portion of light and a second portion of light, and to provide the first portion of light to the first arm of the electro-optic waveguide modulator 102-1 and to provide the second portion of light to the second arm of the electro-optic waveguide modulator 102-2. Accordingly, the first arm of the electro-optic waveguide modulator 102-1 may be configured to receive and propagate the first portion of light to the combiner 208 (e.g., via a waveguide 106-1 of the first arm of the electro-optic waveguide modulator 102-1, such as in a similar manner as that described herein in relation to FIG. 1), and the 11econdd arm of the electro-optic waveguide modulator 102-2 may be configured to receive and propagate the second portion of light to the combiner 208 (e.g., via a waveguide 106-2 of the second electro-optic waveguide modulator 102-2, such as in a similar manner as that described herein in relation to FIG. 1). The first plurality of electrodes 212-1 may be configured to apply a first electrical field to the first arm of the electro-optic waveguide modulator 102-1 (e.g., to enable electro-optic modulation of the first portion of light as the first portion of light propagates through the first arm of the electro-optic waveguide modulator 102-1), and the second plurality of electrodes 212-2 may be configured to apply a second electrical field to the second arm of the electro-optic waveguide modulator 102-2 (e.g., to enable electro-optic modulation of the second portion of light as the second portion of light propagates through the second arm of the electro-optic waveguide modulator 102-2). The combiner 208 may thereby be configured to interferometrically combine the first portion of light and the second portion of light into interferometrically combined light and to provide the interferometrically combined light to the one or more output waveguides 210. The one or more output waveguides 210 may be configured to propagate the combined light away from the combiner 208, such as to an output of the electro-optic device 202 (or to another component of the electro-optic device 202, not shown in FIG. 2).

As shown in FIG. 2, each of the first arm of the electro-optic waveguide modulator 102-1 and the second arm of the electro-optic waveguide modulator 102-2 may include a waveguide 106 with non-constant width 114 (e.g., a non-constant width 114-1 for a waveguide 106-1 of the first arm of the electro-optic waveguide modulator 102-1 and a non-constant width 114-2 for a waveguide 106-2 of the second arm of the electro-optic waveguide modulator 102-2). For example, as shown in FIG. 2, a width 114-1-A of the waveguide 106-1 of the first arm of the electro-optic waveguide modulator 102-1 near an input end 120-1 of the waveguide 106-1 may be less than a width 114-1-B of the waveguide 106-1 near an output end 122-1 of the waveguide 106-1. That is, as shown in FIG. 2, a sidewall of the waveguide 106-1 may be tapered (e.g., angled with respect to the first direction, which is parallel to the z-axis). As another example, as shown in FIG. 2, a width 114-2-A of the waveguide 106-2 of the second arm of the electro-optic waveguide modulator 102-2 near an input end 120-2 of the waveguide 106-2 may be less than a width 114-2-B of the waveguide 106-2 near an output end 122-2 of the waveguide 106-2. That is, as shown in FIG. 2, a sidewall of the waveguide 106-2 may be tapered (e.g., angled with respect to the first direction, which is parallel to the z-axis). While FIG. 2 shows respective sidewalls of the waveguide 106-1 and 106-2 as tapered, a sidewall may be tapered, curved, corrugated, and/or rough (e.g., in a similar manner as that described herein in relation to FIG. 1). Further, one or both of the sidewalls may be tapered, curved, corrugated, and/or rough.

In this way, the non-constant widths 114 of the waveguides 106 of the first arm of the electro-optic waveguide modulator 102-1 and the second arm of the electro-optic waveguide modulator 102-2 enables respective acousto-optic resonances in the first arm of the electro-optic waveguide modulator 102-1 and the second arm of the electro-optic waveguide modulator 102-2 to be minimized, in a similar manner as that described elsewhere herein.

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more functions described as being performed by another set of components shown in FIG. 2.

Figure 3:
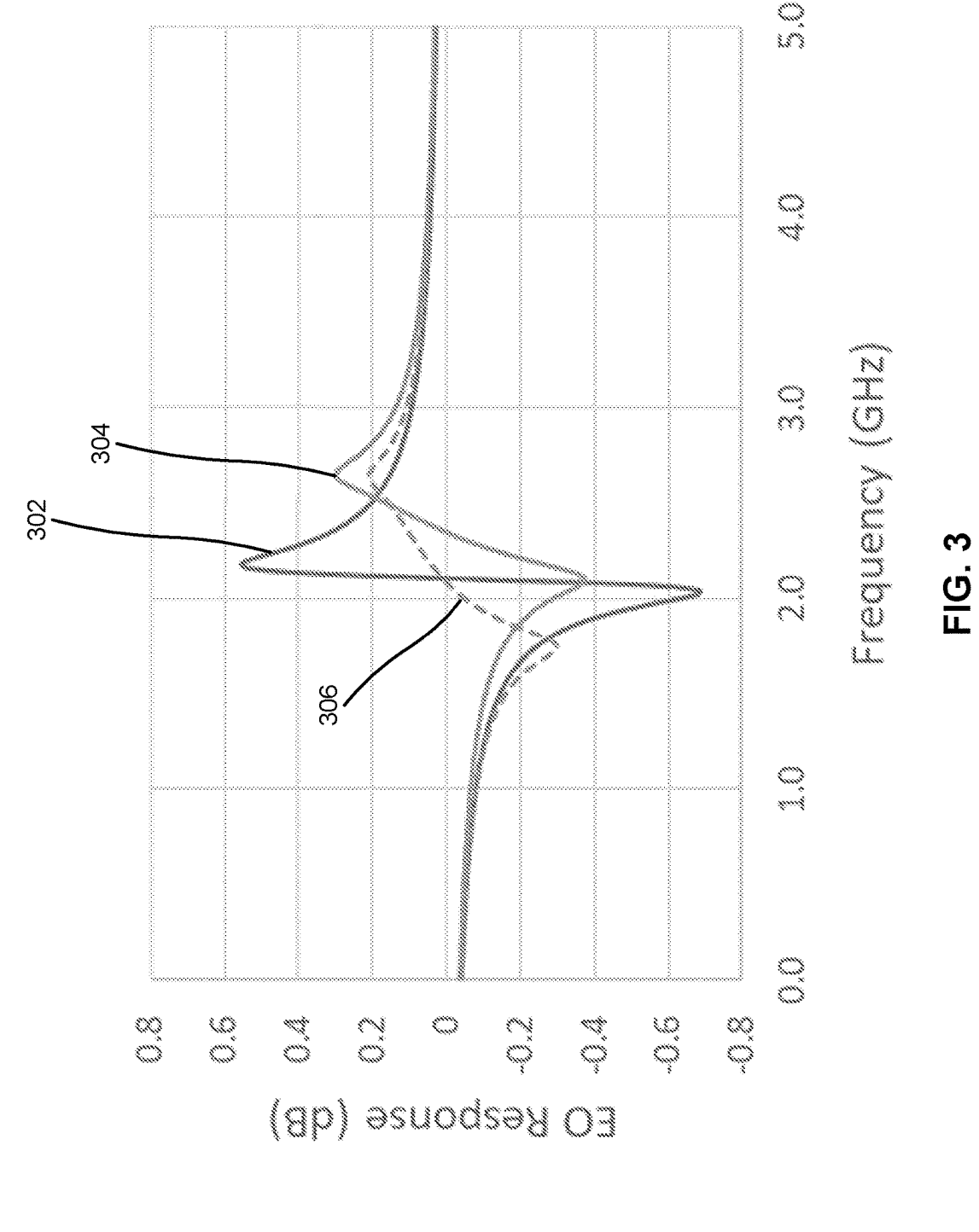
FIG. 3 is a diagram of an example plot related to example implementations described herein.

FIG. 3 is a diagram of an example plot 300 related to example implementations described herein. The plot 300 shows respective electro-optic resonances of different electro-optic waveguide modulators. For example, a first curve 302, that is associated with an electro-optic waveguide modulator that has a constant width waveguide (e.g., with a width of 1 μm), indicates an acousto-optic resonance with a large amplitude (e.g., from −0.7 to 0.5 decibels (dB)) that is concentrated in a narrow frequency range (e.g., from 2.0 GHz to 2.2 GHz). A second curve 304, that is associated with a first electro-optic waveguide modulator that has a first non-constant width waveguide (e.g., with a width that ranges from 0.9 to 1.1 μm), indicates an acousto-optic resonance with a reduced amplitude (e.g., from −0.4 to 0.3 dB) that is distributed across a broad frequency range (e.g., from 2.1 GHz to 2.7 GHz). A third curve 306, that is associated with a second electro-optic waveguide modulator that has a second non-constant width waveguide (e.g., with a width that ranges from 0.8 to 1.2 μm), indicates an acousto-optic resonance with a further reduced amplitude (e.g., from −0.3 to 0.2 dB) that is distributed across an even broader frequency range (e.g., from 1.8 GHz to 2.7 GHz). In this way, plot 300 shows examples of electro-optic waveguide modulators with non-constant width waveguides that have acousto-optic resonances that are minimized as compared to that of an electro-optic waveguide modulator with a constant width waveguide.

As indicated above, FIG. 3 is provided as an example. Other examples may differ from what is described with regard to FIG. 3.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "X material" or "X solution," where X is a chemical composition, such as indium phosphide (InP), gallium arsenide (GaAs), indicates that at least a threshold percentage of X is included in the X material or X solution. The threshold percentage may be, for example, greater than or equal to 1%, 5%, 10%, 25%, 50%, 75%, 85%, 90%, 95%, and/or 99%. As used herein, when a material or solution is referred to by a specific chemical name or formula, the solution or material may include non-stoichiometric variations of the stoichiometrically exact formula identified by the chemical name. Further, the solution or material may include ternary, quaternary, and higher-order compounds.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An electro-optic waveguide modulator, comprising:
a deep-etched waveguide;
a first cladding that is disposed on a top surface of the deep-etched waveguide; and
a second cladding that is disposed on a bottom surface of the deep-etched waveguide, wherein:
the deep-etched waveguide has a length that extends in a first direction and a width that extends in a second direction, and
the width of the deep-etched waveguide is non-constant along at least a portion of the length of the deep-etched waveguide.

2. The electro-optic waveguide modulator of claim 1, wherein the deep-etched waveguide comprises a material that includes at least one of indium phosphide (InP), gallium arsenide (GaAs), aluminum gallium arsenide (AlGaAs), lithium niobate (LiNbO$_3$), silicon (Si), indium antimonide (InSb), gallium antimonide (GaSb), indium arsenide (InAs), or gallium phosphide (GaP).

3. The electro-optic waveguide modulator of claim 1, wherein no cladding is disposed on sidewalls of the deep-etched waveguide.

4. The electro-optic waveguide modulator of claim 1, wherein a passivation layer is disposed on each sidewall of the deep-etched waveguide.

5. The electro-optic waveguide modulator of claim 1, wherein a difference between a maximum width of the deep-etched waveguide and a minimum width of the deep-etched waveguide along at least the portion of the length of the deep-etched waveguide satisfies a width difference threshold that is equal to 10% of the maximum width.

6. The electro-optic waveguide modulator of claim 1, wherein a sidewall of the deep-etched waveguide along at least the portion of the length of the deep-etched waveguide is at least one of tapered, curved, corrugated, or rough.

7. The electro-optic waveguide modulator of claim 1, wherein the deep-etched waveguide includes a core that is disposed within a central region of the deep-etched waveguide.

8. An electro-optic waveguide modulator, comprising:
a deep-etched waveguide, wherein:
the deep-etched waveguide has a length that extends in a first direction and a width that extends in a second direction, and
a difference between a maximum width of the deep-etched waveguide and a minimum width of the deep-etched waveguide along at least a portion of the length of the deep-etched waveguide satisfies a width difference threshold that is equal to 10% of the maximum width.

9. The electro-optic waveguide modulator of claim 8, further comprising:
a first cladding that is disposed on a top surface of the deep-etched waveguide; and
a second cladding that is disposed on a bottom surface of the deep-etched waveguide.

10. The electro-optic waveguide modulator of claim 8, wherein no cladding is disposed on sidewalls of the deep-etched waveguide.

11. The electro-optic waveguide modulator of claim 8, wherein a passivation layer is disposed on each sidewall of the deep-etched waveguide.

12. The electro-optic waveguide modulator of claim 8, wherein the deep-etched waveguide comprises a material that includes at least one of indium phosphide (InP), gallium arsenide (GaAs), aluminum gallium arsenide (AlGaAs), lithium niobate (LiNbO$_3$), silicon (Si), indium antimonide (InSb), gallium antimonide (GaSb), indium arsenide (InAs), or gallium phosphide (GaP).

13. The electro-optic waveguide modulator of claim 8, wherein a sidewall of the deep-etched waveguide along at least the portion of the length of the deep-etched waveguide is angled with respect to the first direction.

14. The electro-optic waveguide modulator of claim 8, wherein a sidewall of the deep-etched waveguide along at least the portion of the length of the deep-etched waveguide is curved with respect to the first direction.

15. An electro-optic device, comprising:
an electro-optic waveguide modulator with a deep-etched waveguide, wherein:
the deep-etched waveguide has a length that extends in a first direction and a width that extends in a second direction, and
the width of the deep-etched waveguide is non-constant along at least a portion of the length of the deep-etched waveguide.

16. The electro-optic device of claim 15, wherein the electro-optic device is a Mach Zehnder modulator chip.

17. The electro-optic device of claim 15, further comprising a first combiner and a second combiner, wherein:
the electro-optic waveguide modulator is configured to receive light from the first combiner, to propagate the light via the deep-etched waveguide, and to provide the light to the second combiner.

18. The electro-optic device of claim 15, further comprising another electro-optic waveguide modulator with another deep-etched waveguide, wherein:
the other deep-etched waveguide has a length that extends in the first direction and a width that extends in the second direction, and
the width of the other deep-etched waveguide is non-constant along at least a portion of the length of the other deep-etched waveguide.

19. The electro-optic device of claim 15, wherein a sidewall of the deep-etched waveguide along at least the portion of the length of the deep-etched waveguide is at least one of tapered, curved, corrugated, or rough.

20. The electro-optic device of claim 15, wherein the deep-etched waveguide comprises a material that includes at least one of indium phosphide (InP), gallium arsenide (GaAs), aluminum gallium arsenide (AlGaAs), lithium niobate (LiNbO$_3$), silicon (Si), indium antimonide (InSb), gallium antimonide (GaSb), indium arsenide (InAs), or gallium phosphide (GaP).

* * * * *